July 6, 1937.  K. WAHL  2,086,289
APPARATUS FOR COPYING FILMS
Filed Oct. 12, 1933  2 Sheets-Sheet 1
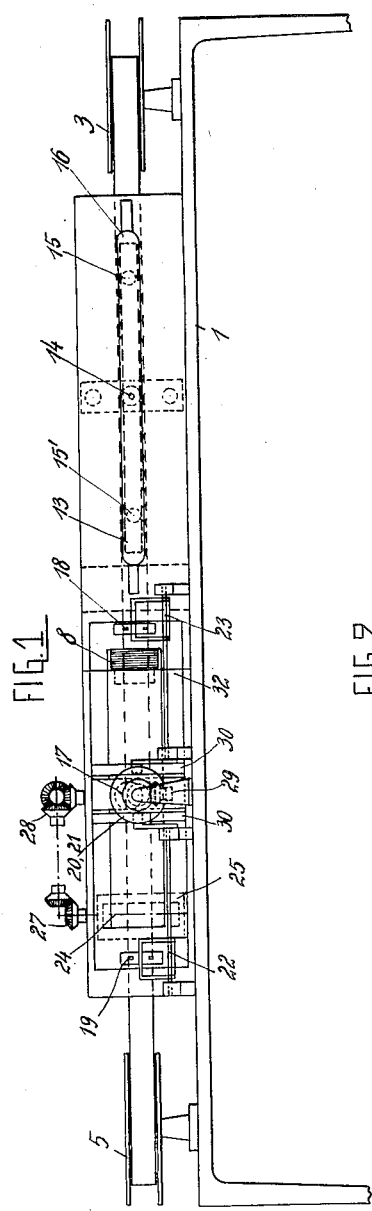
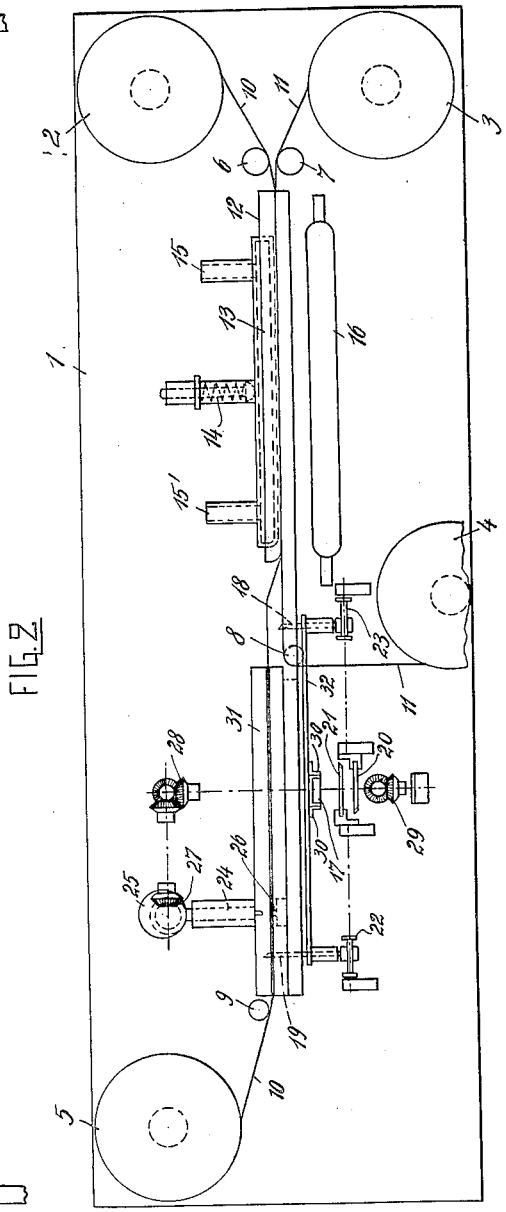
Inventor:
Karl Wahl
by: Marks & Clerk
Attys.

July 6, 1937.   K. WAHL   2,086,289
APPARATUS FOR COPYING FILMS
Filed Oct. 12, 1933   2 Sheets-Sheet 2
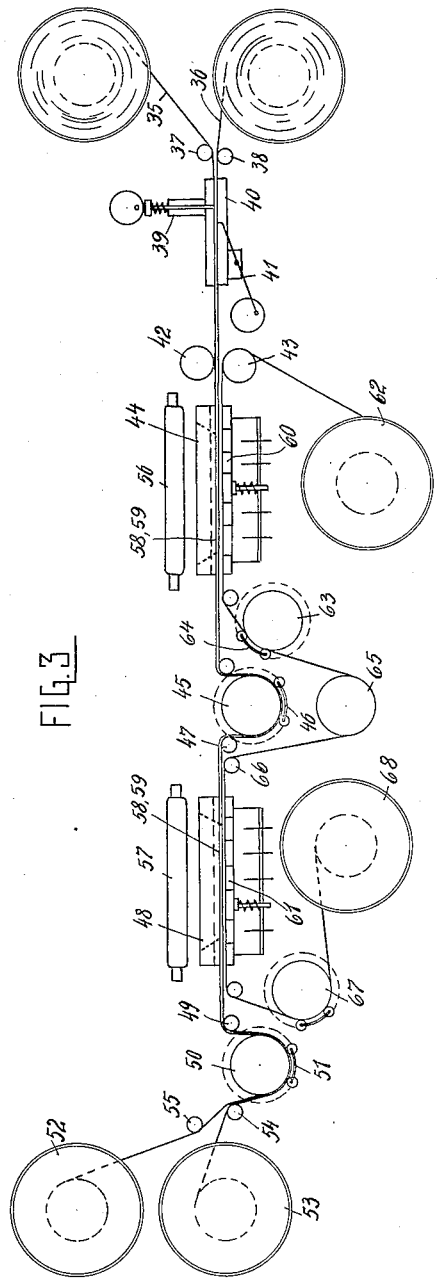
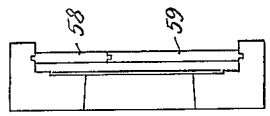
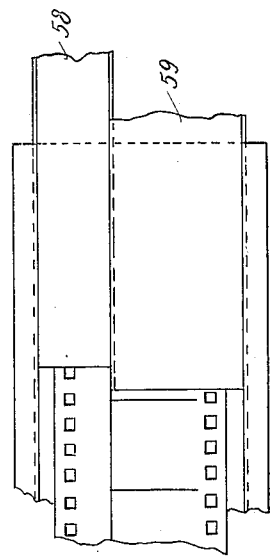
Inventor:
Karl Wahl
by: Marks & Clerk
Attys.

Patented July 6, 1937

2,086,289

UNITED STATES PATENT OFFICE 2,086,289

APPARATUS FOR COPYING FILMS

Karl Wahl, Berlin-Karlshorst, Germany, assignor to the firm Sifico A. G., Schaffhausen, Switzerland Application October 12, 1933, Serial No. 693,363
In Germany October 26, 1932

1 Claim. (Cl. 164—89)

This invention relates to the copying of films.

In the copying of films, when the positive and the negative are led together over several part-pictures through an exposure-gate, parts which are indistinct or not sharp frequently occur, and are to be ascribed to different treatments of the material of the negative film and the positive film. Even with materials which have been treated in the same way indistinct parts occur when the materials are from different sources of origin. These indistinct parts are to be mainly ascribed to differences in the perforating.

The principal object of the invention is to remove these drawbacks, and to this end, the positive film on its way from the exposure-gate is provided with perforations corresponding to the perforations in the negative film, whereby all mistakes in copying are satisfactorily removed.

The machine for carrying out the method is characterized essentially by the fact that a slide operated by an eccentric and having pairs of claws or feed devices for the films is arranged between the successively situated take-up spools, for the negative film and positive film, and between the claws a punching device is provided for the perforating of the positive film. In order, in the case of films for color cinematography which have been made by the lenticular screen method, to remove with certainty the defects, such as inexact register of the screen and distortion or confusion of the color values, which are to be ascribed to shrinkage of the material, according to the invention the perforating and embossing of the screen of the positive film, as well as its exposure, are carried out in one working operation, and the perforating and embossing controlled by the negative film.

Finally the invention has also for its object the provision of a copying apparatus having two exposure-gates, by which when dealing with sound-films, picture and sound can be simultaneously copied.

For this purpose, the apparatus is so constructed that a punching device and a claw are situated in advance of the exposure gates; and between the light sources and the pressure members for the films a black film is fed forward by separate guide-rollers and by a conveying mechanism of its own, whilst beyond each exposure-gate a conveying drum is arranged for the simultaneous forward feed of the positive and negative films.

Each exposure-gate has, in this case, two relatively displaceable shutters, in order to unmask the picture copy and the sound copy independently of each other. The two shutters are provided with a tongue-and-groove guide at opposite edges at the division line for picture and sound.

Copying machines for carrying out the method according to the invention are shown by way of example in the drawings, in which Figure 1 is an elevation of a copying machine according to the invention.

Figure 2 a plan view of the machine shown in Figure 1.

Figure 3 an elevation of a machine for copying sound films.

Figure 4 a plan view of the shutters for masking the picture and sound films, and Figure 5 an end elevation of the shutters shown in Figure 4.

In the copying machine shown in Figures 1 and 2, spools or reels 2, 3, 4 and 5 for supplying and taking up the positive film 10 and the negative film 11 are revolubly mounted on a frame or table 1.

In proximity to the supply spools 2 and 3 are guide-rollers 6 and 7, whilst further guide-rollers 8 and 9 are provided for conducting the positive film 10 and the negative film 11 in the desired manner through the machine. In proximity to the rollers 6 and 7 the film-gate 12 is provided with a pressure-plate 13, which stands under the action of a spring 14, and is provided with pipes 15 and 15' for supplying and carrying away cooling water. In front of the gate 12 is a copying lamp 16. In the path of the positive film 10 and the negative film 11 a guide 31 for the positive film 10 is situated beyond the film-gate 12. Laterally of this guide 31 a plate or a slide 32 is provided having a guide 30 for an eccentric 17. The slide 32 carries on its ends pairs of claws 18 and 19, which serve respectively for the feed of the films 11 and 10. The claws 18 and 19 respectively are moved by cams 20, 21 and rods 22, 23, towards and away from the negative film and positive films. The positive film 10 coming from the spool 2 is not yet provided with perforations, and only receives them during the movement through the guide 31 by a punch 24 co-operating with a die 26. The former is reciprocated by an eccentric 25. The eccentric 17, as well as the eccentrics 20, 21 and 25 are rotated by suitable gearing through bevel-wheels 27, 28, 29.

In carrying the new method into effect, the positive film 10 coming from the spool or reel 2, and not yet perforated, is first made to adhere to the negative film 11 for a short length, and then passed through the gate 12. The negative film 11 is led over the roller 8 to the take-up spool 4, whilst the positive film 10, which is no longer connected with the film 11, is led through the guide 31 situated between the spools 4 and 5 and over the roller 9 to the spool 5.

The slide 32 is moved by the eccentric 17 to right and left by one division of the perforations, whereby the claws 18 and 19 come out of or into engagement with the perforations of the film 11 and the positive film 10. The perforations in the positive film 10 are made by the punch 24, 26 during the exposure, and in fact a perforation is made each time the slide 32 with the claws 18 and 19 is moved towards the gate 12.

As the negative film 11 and the positive film 10 are moved forward absolutely always the same distance owing to the feed movement by the claws 18 and 19 provided on the common slide 32, and the positive film 10 is perforated only shortly before the forward feed, the properties of both materials have no influence on the copying itself. Any danger of shrinkage, which otherwise always exists, is satisfactorily removed by the new method.

In the copying of films for color cinematography, the unperforated positive film, together with the perforated negative film, are led through a copying apparatus, by whose accessory apparatus the negative film has been perforated and provided with a screen. The perforating and the embossing of the screen take place in this case, not as in the known processes continuously by rolls or cylinders or the like, or rather by the single embossing of a particular whole picture, but in sections from one perforation hole to the other. During the copying the perforating and the embossing of the screen are controlled by the negative film to be copied in such a way that the perforating and embossing of the positive film correspond exactly to those of the negative film.

As is well known, in the case of a normal film four perforations are provided for each picture, so that in such a case the embossing of the positive film is effected in four sections on the space of a picture. Consequently, any shrinkage values that occur are compensated for within each picture, and can therefore practically no longer have a disturbing effect.

In the copying machine for sound films shown in Figures 3 to 5, the supply spools or reels for the negative film 35 and the positive film 36 are revolubly mounted on a frame or table, which is not shown in the drawings. Close to these spools the guide-rollers 37 and 38 are situated, whilst directly succeeding these rollers the punch 39 for perforating the positive film 36 is provided in the guide 40 for the films. A claw 41 co-operates with the guide 40 and engages in the perforations in the films, in order to convey the two films through the guide-rollers 42 and 43 to the first exposure-gate 44. A toothed conveying drum 45 is situated in succession to the exposure-gate 44, and the two films 35 and 36, which are pressed by pressure rollers 46 against the drum 45, are conducted by the said drum over a guide-roller 47 to the second exposure-gate 48. Beyond the exposure-gate 48 is situated a conveying roller 49, over which the films 35 and 36 pass to a second toothed conveying drum 50 having pressure rollers 51. In advance of the take-up spools 52 and 53 revolubly mounted on the table or frame and beyond the conveying drum guide-rollers 54 and 55 are provided for the films 36 and 35 respectively. The exposure-gates 44 and 48 have each a source of light 56 and 57, and in the exposure-gates two relatively displaceable shutters 58 and 59 are arranged by which the picture copy and the sound copy can be unmasked independently of each other.

The edges of the slides or shutters 58 and 59 which abut against each other on the division line for picture and sound records are provided with interengaging projections and grooves, so as to obtain good guidance. Below the exposure-gates 44 and 48 are situated articulated pressure pieces 60 and 61 by which the films are pressed against the gate guide.

Below the exposure-gate 44 a spool or reel is revolubly mounted on the table or frame, from which a black film 62 runs off, which is led over the guide-roller 43 and conducted between the negative film 36 and the pressure member 60 through the gate 44 together with the films 35 and 36. In succession to the exposure-gate 44 is a toothed conveying drum 63, having pressure rollers 64 by which the black film 62 is fed forward. The film 62 then runs over guide-rollers 65 and 66 in the way as above described through the second exposure-gate 48, in order to be led over a guide-roller to a second toothed conveying drum 67 having pressure rollers, from which it is wound up on a spool or reel 68 also revolubly mounted in the machine frame. The black film 62 is for the purpose of preventing during the copying reflections which may be caused by the pressure members 60 and 61.

The driving of the conveying drums 63 and 57 for the black film 62 is effected independently of the drive of the conveying drums 45 and 50 for the films 35 and 36.

At the beginning of the copying operation only the negative film 35 first runs through the guide 40, and is fed forward by the claw 41 each time to the extent of one perforation. The punch 39 is so adjusted that after the forward movement of the film it always exactly engages in the next perforation.

If now the positive film 36 is also moved into the guide 40, it is perforated by means of the punch 39 exactly corresponding to the film 35. The conveying of the films can then take place uninterruptedly, whereby an exact copying is ensured, with the advantage that the picture copy and the sound copy can be simultaneously made.

As the black film 62 has its own conveying mechanism 63 and 67, it can exert no deleterious influence on the forward feed of the films 35 and 36.

Although in the example of construction of the copying machine shown in Figures 3 and 4 only two exposure-gates are provided, the machine may also be fitted with only one, or even with several exposure-gates, so that the possibility is afforded, by regulation, of copying the films slower or quicker.

I claim:

In a film copying apparatus, feed and take-up spools for an unperforated positive film, feed and take-up spools for a perforated negative film, the take-up spools for the negative film being spaced from the take-up spools for the positive film in a direction in advance of the direction of movement of the films, a guide for the portions of the positive film lying intermediate said take-up spools, a punching device for the positive film arranged over said guide, a reciprocating slide, pairs of claws carried by said slide, one pair of claws being arranged to engage in the perforations of the negative film and the other pair of claws being arranged to engage in the perforations formed in the positive film by said punching device whereby both films are moved forwardly to the same extent and the spacing between the perforations formed by said punching device in the positive film corresponds exactly to the spacing between the perforations of the negative film said punching device being arranged at one side and said claws at the opposite side of said positive film, an eccentric device for imparting longitudinal movement to said slide to effect feeding movement of the films, eccentric means for actuating the claws to engage and disengage the latter with the films, and a driving connection between the several eccentric means and said punching device.

KARL WAHL.